Sept. 16, 1930.　　　　C. HINDE　　　　1,776,070
PROCESS OF DISPOSING OF SULPHURIC ACID MATERIALS
Filed Dec. 3, 1928　　2 Sheets-Sheet 1
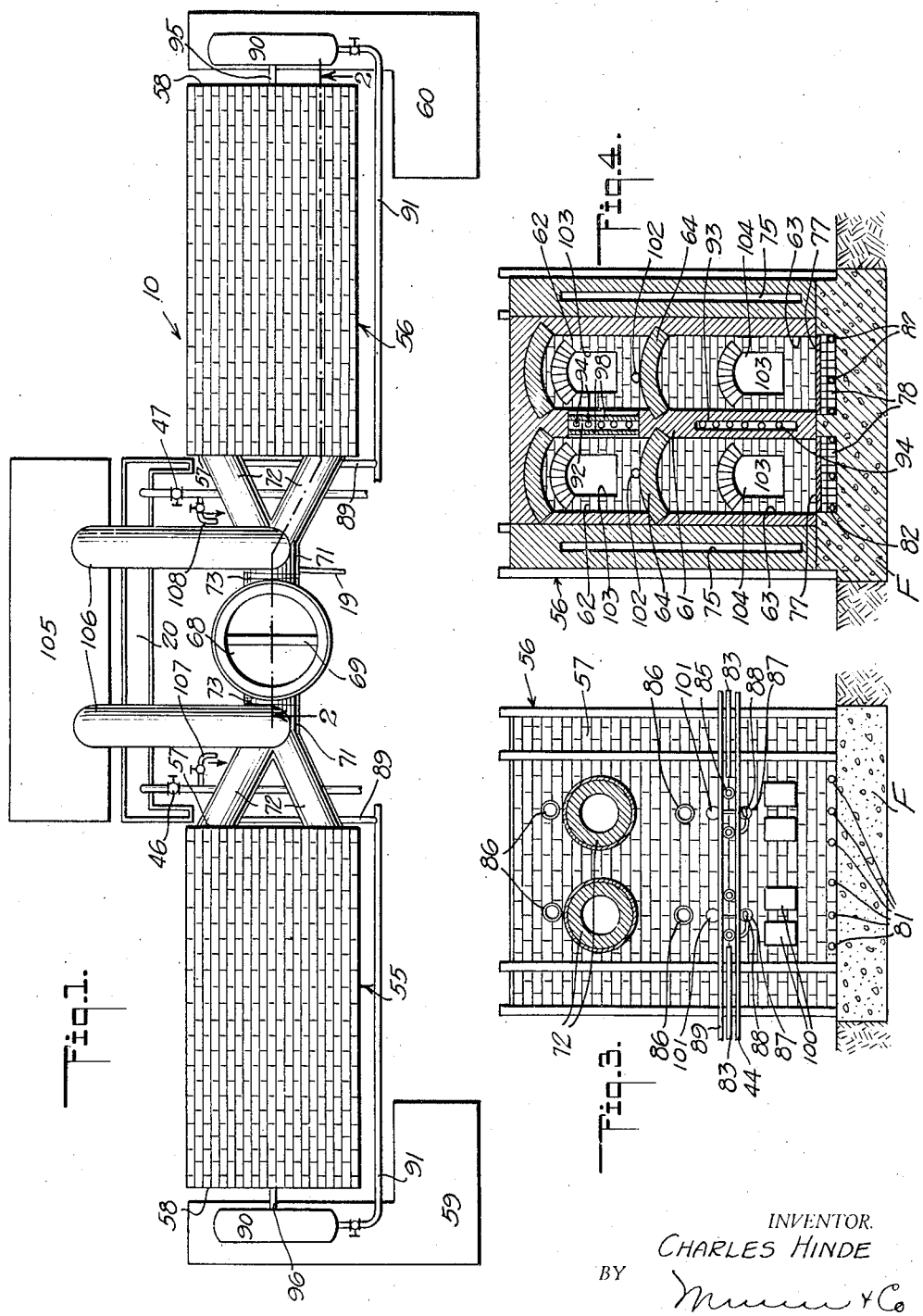
INVENTOR.
CHARLES HINDE
BY
ATTORNEYS.

Sept. 16, 1930.   C. HINDE   1,776,070
PROCESS OF DISPOSING OF SULPHURIC ACID MATERIALS
Filed Dec. 3, 1928   2 Sheets-Sheet 2
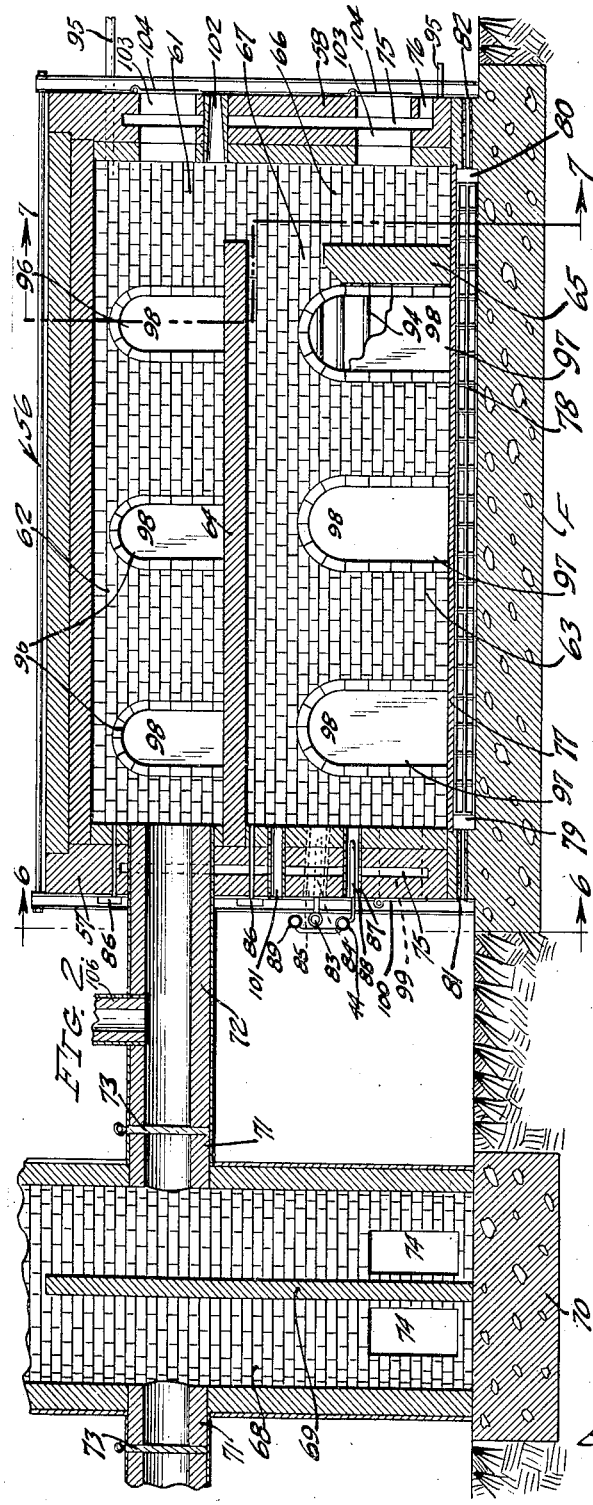

Patented Sept. 16, 1930

1,776,070

UNITED STATES PATENT OFFICE

CHARLES HINDE, OF WILMINGTON, CALIFORNIA

PROCESS OF DISPOSING OF SULPHURIC ACID MATERIALS

Application filed December 3, 1928. Serial No. 323,551.

The main object of the invention is to dispose of materials, which contain carbonaceous portions and also contain sulphur compound portions of an acid strength sufficient for causing corrosion of corrosive substances, as, for instance, the sludges produced in the refining of petroleum products, by subjecting the materials to the action of intense heat within certain limits so as to consume the carbonaceous portions in the materials and to form sulphur dioxide gas ($SO_2$) from the sulphur compound portions of the materials, and for causing the sulphur dioxide and other gases mixed therewith to be diluted with air and to be discharged in the atmosphere at such a height as not to be injurious to living organisms or vegetation, and not to be objectionable to persons in the vicinity of the place where the sulphur dioxide is formed.

Another object of the invention is to carry out the aforementioned process by means of an apparatus, including an elongated, substantially horizontally extending furnace, formed interiorly of a fire- and acid-resisting material and adapted to receive therein the acid material that is to be disposed of, so that the acid material is caused to move into, or longitudinally through, the furnace and during its travel is subjected to the action of intense heat within certain limits, thereby vaporizing the acid material and causing the consumption of the carbonaceous portions thereof as well as changing the sulphur compound portions of the acid material into sulphur dioxide before such portions reach the chimney or flue that leads from the furnace, and for causing the sulphur dioxide and other gases mixed therewith to be diluted with air and to be discharged in the atmosphere through the chimney in the manner already mentioned.

With such objects and with other objects in view, my invention, consisting in the aforementioned process of disposing of acid materials, includes the novel construction and combination of parts hereinafter described, illustrated in the accompanying drawings, and set forth in the appended claims, it being understood that various changes in the form, proportion, size and minor details of construction within the scope of the claims may be resorted to without departing from the spirit, or without sacrificing any of the advantages, of the invention.

In the drawings:

Figure 1 is a plan view of the apparatus for practicing my process;

Figure 2 is a section taken substantially on line 2—2 of Figure 1;

Figure 3 is a section taken on line 3—3 of Figure 1;

Figure 4 is a section taken substantially on line 4—4 of Figure 1.

In carrying the invention into practice, I preferably employ a set of furnaces 55 and 56. However, in this connection, it will be understood that use can be made of a single furnace. In any event, it should be understood that said furnace or furnaces shall be interiorly lined with fire- and acid-roof material, such as firebrick, or same may be entirely constructed of such material.

Each of the furnaces preferably has therein centrally a longitudinally extending vertical wall 61 so that the furnace is thereby divided into two compartments, and each compartment is divided into an upper chamber 62 and a lower chamber 63 by an arched partition 64, which extends from the front wall 57 the major length of the compartment and with its rear end overhangs a virtually vertical baffle wall 65. By this construction the lower chamber 63 forms a fire box in front of the baffle wall, while a chamber 66 is formed in the rear of the baffle wall and the arched partition 64, and while a passage 67 is formed between the top of the baffle wall and the arched partition so that communication between the fire box chamber 63 and the upper chamber 62 is thus established through the passage 67 and the rear chamber 66.

A chimney 68, interiorly provided with a diametrical baffle wall 69 at its lower portion, is arranged between the furnaces 55 and 56 upon a foundation 70 which may be of concrete or some other suitable material. Two smoke pipes 71, each being unitary at one end portion and provided with bifurcations 72 at its other end portion, have their unitary end portions connected with the chimney on opposite sides of the baffle wall 69, and the bifurcations 72 of one smoke pipe extend through the front wall 57 of the furnace 55 to the respective upper chambers 62 therein, while the bifurcations of the other smoke pipe extend through the front wall 57 of the furnace 56 to the respective upper chambers in the latter. Each of the smoke pipes 71 is preferably provided with a slidable damper 73, operable by any suitable means, not shown. Like the furnaces, the chimney and the smoke pipes are either lined interiorly with a fire and acid-proof material such as fire brick, as shown in Fig. 2, or are wholly constructed of such a material.

On each side of the baffle wall 69 and preferably slightly above the foundation 70, the chimney 68 has therein an opening 74. A suitable door, not shown, is provided for each of these openings so that the draft through the chimney may thereby be regulated and that access may be had to the interior of the chimney whenever required. Preferably, the chimney is further of a considerable height, approximately 150 feet, so that the gases, which are diluted with air as a result of the draft provision and are expelled through the chimney, will not be liable to cause injury to living organisms or vegetation and will not be objectionable to persons in the vicinity of the furnaces.

The side and end walls of each furnace are formed so as to provide within them a continuous air space 75. This air space communicates with the atmosphere through openings 76 in the rear wall of the respective furnace. Cool air is thus continuously circulated through the furnace walls so that thereby the outsides of the furnaces are prevented from being excessively heated. In order to assist in keeping the furnaces comparatively cool on their outsides the air spaces 75 may also be filled with a suitable insulating material.

As shown in Figs. 2 and 4, it is preferred that each of the furnace compartments has a bottom 77, which rests only with its edges directly on the foundation F, and that a space is otherwise provided between the foundation and each bottom 77. A layer of parallel rows of hollow bricks 78, each with the usual two longitudinal openings formed therein, is integrally secured in this space on the foundation and serves as a support for the respective bottom 77. The bricks are placed so that their openings extend longitudinally of the respective furnace and that the openings in one brick are aligned with the respective openings in the other bricks in the same row, thus forming a number of longitudinal passages for air below the bottoms 77. Each layer of bricks is further arranged so that an air space 79 is formed within the foundation F below each bottom 77 and at the front end of the layer of bricks and that an air space 80 is similarly formed at the rear end of the layer of bricks. Tubes 81 extend through the front of each furnace to the air space 79 therein, and other tubes 82 similarly extend through the rear of each furnace to the air space 80, so that cool air will continuously pass through the hollow bricks under the respective bottoms 77 and will thereby prevent the latter from being excessively heated.

A heating medium, such as oil or gas, is led from a suitable source through a pipe 83 to burners 84, of which preferably two are provided for each compartment of the respective furnaces. These burners are of any preferred construction and extend into fire and acid-proof tubes 85, set integrally in the front wall 57 of each furnace, so that the burners are adapted to impel the burning medium into the lower chambers or fire boxes 63 of the furnace toward the baffle walls 65 and through the passages 67, the rear chambers 66, and thence forward through the upper chambers 62. In this connection it should be observed that the furnaces are so constructed and the burners are so arranged in relation thereto that the heating medium will be evenly distributed and will cause the furnaces to be interiorly heated to a high temperature. It is estimated that by my arrangement the interior furnace-temperature, during the operation of the furnaces, will range between 500° F. and 3000° F. For the purpose of informing an operator of the exact interior temperature of the furnaces, each of them is provided with suitable thermometers 86.

Below the level of the tubes 85, the front walls 57 of the furnaces have integrally set therein other tubes 87, one for each lower chamber 63. Into each of the tubes 87 extends an atomizer 88 of a suitable type, Fig. 2 showing the connection of the pipe line 44 with the respective atomizer for one of the lower chambers in the furnace 56, and it being understood therefrom that the same pipe line is similarly connected with the atomizer for the other lower chamber in the same furnace and also that the pipe line 42 is similarly connected with the atomizers for the lower chambers in the furnace 55. By this arrangement of the atomizers in conjunction with the pipe lines 42 and 44, the acid tars or sludges may be continuously fed to said atomizers.

For the purpose of effectively distributing the acid tars or sludges into the furnaces, each atomizer is provided with a passage for steam or compressed air, and each of these steam or air passages has a suitable connection with a pipe 89, which is arranged in front of each of the furnaces 55 and 56, and may lead from a suitable air compressor, not shown, or, as is preferred, from a steam-generating source. In Fig. 1 the steam-generating source is shown as a boiler 90, one in each of the boiler houses 59 and 60, and in the same figure a valve-controlled pipe line 91 is indicated as being connected with the respective pipes 89, while in Fig. 2 is shown the connection of one of the pipes 89 with one of the atomizers for the furnace 56, so that the connections of the other atomizers with the respective pipes 89 is understood therefrom.

Although steam may be independently generated in the boilers by any suitably arranged heating means within the respective boiler houses 59 and 60, it is for the purpose of steam-generation preferred to utilize the heat in the furnaces 55 and 56 either entirely or in conjunction with other heating means. In order thus to utilize the heat in the furnaces, the vertical wall 61 in each furnace has preferably two longitudinal openings 92 and 93 therein, as shown in Fig. 4, the opening 92 being formed in the wall between the two upper chambers 62, and the opening 93 being formed in the wall between the two lower chambers 63 in each furnace. In these openings are placed pipes 94, which are connected with one another so as to form a continuous passage for steam and are connected by terminal pipes 95 with the respective boiler 90 so as to constitute a complete steam-circulation system between each of the furnaces 55 and 56 and the boiler. As the wall 61 is heat-resisting, it is provided with two series of openings 96 and 97, which in Fig. 2 are shown as arched and as being arranged respectively between the upper chambers and between the lower chambers in each furnace. These openings are closed on each side of the series of steam pipes 94 by thin slabs 98 of a suitable material, so that the slabs allow the heat in the upper and the lower chambers of each furnace to radiate into the openings 92 and 93 and around the steam pipes 94 and at the same time prevent the pipes from being excessively heated and from being exposed to the corrosive action of the fumes in the upper and the lower chambers of the furnace.

For the purpose of providing convenient means for draft regulation through the furnaces in addition to that furnished by the openings 74 in the chimney 68 and also for the purpose of admitting solid acid material or acid material of a coke nature into the furnaces, each front wall 57 is provided with a pair of openings 99 for each lower chamber in the respective furnace, and a door 100 is hinged to the wall 57 in front of each opening 99 and may be provided with suitable means for holding it closed or in an adjusted open position in front of the respective opening, so that the doors may be easily opened, whenever it is necessary to introduce the solid material into the furnaces, and that the doors may be automatically swung to their required positions for the proper regulation of draft through the furnaces. However, since means for regulating the swinging movements of furnace doors are well known in the art and are not a part of my invention, an illustration thereof is deemed superfluous and is therefore omitted.

The front wall 57 of each furnace has therein a peep hole 101 for each lower chamber 63. An operator is thereby enabled, without disturbing the draft conditions through the furnace, to watch from the front of the furnace the chemical changes that take place in the acid material within the lower chambers of the furnace. Similarly, the rear wall 58 of each furnace has therein on a level somewhat above the arched partition 64 between the upper and the lower chambers and directly behind each upper chamber of the furnace a peep hole 102 in order to enable the operator, also without disturbing the draft conditions through the furnace, to observe from the rear of the furnace the condition of the gases as they travel from the rear toward the front of the respective upper chamber in the furnace.

For the purpose of preventing damage to the furnaces, if explosions should occur within them, the rear wall 58 of each furnace has therein openings 103, preferably arranged so that one such opening is directly behind each upper chamber 62 and another opening is directly behind the baffle wall 65 between each lower chamber 63 and the rear chamber 66 in the respective furnace and that thus the exploding gases readily may be expelled through the openings. These openings, which are normally closed by doors 104, also provide access into each furnace whenever repair therein or cleaning of its interior is required.

When the invention is used in connection with apparatus for reclaiming sulphur dioxide as produced in the aforementioned furnaces, it follows that the dampers 73 may be partially or fully closed and that the gases may be transferred from the flues 72 into the discharge pipes 106, which may lead to any suitable well-known reclaiming apparatus, not shown.

Having described the essential characterizing features of a furnace intended to be used in carrying my process into practice, a detailed description of the progressive actions occurring in the furnace is as follows: Let it be first borne in mind that I have herein described the use of effective furnace temperatures ranging from 500° F. to 3000° F. By this I mean that the heats in the lower chamber 63 are progressively of increasing temperatures from the front of the furnace or point of induction of the carbonaceous material to a point in the direction of the rear wall of said furnace. Acid sludges of the character capable of being sprayed into the combustion chamber of the furnace or materials which may be flowed into the said chamber are usually of high acid and water content, the combustible material being of a negligible order. In solid sludges the percentage of combustible matter is considerably greater. Consequently, it follows that when reducing acid sludges having a high content of water and acid, the maximum heat furnished primarily by the burners should be appreciably greater than in cases where the acid and water content is lower, such, for example, as solid sludges. Also, it manifestly follows that whatever may be the temperature of heat produced primarily by the burners, the heat is proportionately increased incident to added combustion produced by the work of decomposing volatile or carbonaceous matter contained in the sludge. The said heats ranging from 500° F. to 3000° F. are, therefore, primarily the heats furnished by the action of the burners at the front of the furnace, coupled with the influence of the sludge.

Let it be assumed that the burners at the front of the furnace are in operation and that a maximum temperature of 3000° F. has been established at a point in immediate proximity to the rear wall of the combustion chamber. The sludge to be acted upon is now about to be fed into the combustion chamber by means of the atomizers in the front wall thereof, the same occupying positions in close proximity to the burners. It should be appreciated that the combustion chamber of the furnace is elongated, the length being much greater than the height of such chamber. It should also be appreciated that the burners herein employed are of the type which will produce an appreciably long flame in the combustion chamber, in the average instance, a flame which extends about five feet forward from the front wall. I calculate, from reasonably accurate findings and observations, that the temperature of the heat present with the initial action of the sludge is now reduced and maintained at about 500° F. at the front of the furnace and that the heats progressively increase in the length of the combustion chamber until the average heat at the rear wall of the chamber is preferably 3000° F. In this connection, it should be observed that by the time the gases are moved to a position at the passage 67, they are in a reduced dry chemical form and that at or about a position immediately adjacent the front wall of the furnace chamber the water content in the material is evaporated from the acid and partial decomposition of the acid takes place through the presence of hydrocarbon. Then, as the material approaches an intermediate position between the front wall and the aforementioned opening 67, decomposition of the remaining acid and/or $SO_3$ to $SO_2$ is completed with combustion of remaining carbonaceous portions and released oxygen. It is because of the steps just described and the action of the heats upon the materials and acids under treatment that the gases as same are evacuated from the combustion chamber at the opening 67 are in the said reduced hot chemical form.

It manifestly follows that inasmuch as the material under treatment is impelled longitudinally through the chamber provision is made for continuous circulation of the produced gases in a hot state and that the chamber 62, due to the fact that it is in direct communication with the lower combustion chamber, is maintained at a temperature which will hold the circulating gases at a temperature that will insure evacuation of sulphur dioxide and other gases into the stack 68. It is also by observation and close examination that I have been able to calculate that the heat maintained in the forward portion of the upper chamber 62 is considerably less than 3000° F. Now, it should be observed that the stack 68 occupies a position very close to the furnace and that the flue 72 is for this reason comparatively short. In consequence, and in consideration of the combined internal stack area, I have been able to utilize any excess heat in the chamber 62 so that the temperature in the stack is never less than 1650° F., at the same time taking into consideration that I have admitted a diluting medium in the form of air to the gases from a point at the base of the stack. I am able to uniformly maintain this condition of relative heats by providing the aforementioned thermometers 86 in the front wall of the furnace, so that the respective heats in both upper and lower chambers of the furnace can be maintained. I have also calculated for this by providing observation or sight openings 102, which occupy positions adjacent the opening 67, whereby one from the outside can observe conditions within the combustion chamber, all to the extent that should there be a generation of sparks and an emission thereof over the arch wall or at the back of the combustion chamber, the same being indicative of incomplete combustion, I may at that time and in view of such conditions increase the heat as may be required. Inasmuch as an overabundance of air admitted to the stack might possibly serve to cause re-conversion of the sulphur dioxide by reduced temperature, it is urged that care should be exercised so that the air will be admitted to the stack in controlled volumes so that the stack gases at the outlet will at no time be lower than 1650° F., or as near thereto as practicable with permissible amounts of $SO_3$.

I claim as my invention:

The process of continuously disposing of sulphuric acid sludge materials containing sulphuric acid and carbonaceous portions, comprising impelling the materials along a defined course while excluded from the presence of metal while first subjecting the materials to the actions of heats respectively increasing in temperatures so as to first cause evaporation of the water from the acids and permit of certain decomposition of acids by the presence of the carbonaceous portions contained in the materials, and then, cause remaining sulphur trioxide to be decomposed to sulphur dioxide and oxygen and to cause the remaining carbonaceous matter to be consumed, and further causing the sulphur dioxide and the hot gases thus formed to continue in motion while decreasing in temperature so as to insure and maintain the sulphur dioxide and other gases in their reduced hot chemical form, and then admitting air to the hot sulphur dioxide and other gases to dilute same, then discharge the diluted hot sulphur dioxide and other gases into the atmosphere.

CHARLES HINDE.